US012681470B2

(12) United States Patent
Peeples et al.

(10) Patent No.: US 12,681,470 B2
(45) Date of Patent: Jul. 14, 2026

(54) DEVICES AND METHODS FOR SENSOR DATA ANALYSIS OF TRANSIENT ERRORS

(71) Applicant: GE Vernova Infrastructure Technology LLC, Greenville, SC (US)

(72) Inventors: Jordan Peeples, Chesterfield, NH (US); Brian E. Lindholm, Roanoke, VA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 554 days.

(21) Appl. No.: 18/307,910

(22) Filed: Apr. 27, 2023

(65) Prior Publication Data

US 2024/0361758 A1      Oct. 31, 2024

(51) Int. Cl.
*G05B 23/02* (2006.01)

(52) U.S. Cl.
CPC ..... *G05B 23/0221* (2013.01); *G05B 23/0235* (2013.01); *G05B 23/0272* (2013.01)

(58) Field of Classification Search
CPC ............ G05B 23/0221; G05B 23/0235; G05B 23/0272; G01M 15/14; G01M 15/02
See application file for complete search history.

(56) References Cited

U.S. PATENT DOCUMENTS 4,536,126 A  *  8/1985  Reuther .................... H02J 3/42
                                                 290/40 R
8,666,688 B2    3/2014  Spanier et al.

11,480,603 B2    10/2022  Griffin et al.
2011/0244810 A1*  10/2011  Czompo ............. H03M 1/1265
                                                       455/73
2016/0326904 A1*  11/2016  Wu ......................... F01D 17/20
2019/0302155 A1*  10/2019  Jahnke .............. G01R 19/2509

FOREIGN PATENT DOCUMENTS

EA           036979 B1    1/2021
JP       2019508676 A    3/2019

OTHER PUBLICATIONS

European Search Report received for EP24169657 on Sep. 16, 2024; 9 pps.

* cited by examiner

*Primary Examiner* — Yossef Korang-Beheshti
(74) *Attorney, Agent, or Firm* — Armstrong Teasdale LLP

(57) ABSTRACT

A sensor analysis system for monitoring operation of a turbine engine of a power plant, the sensor analysis system including a turbine control system configured to monitor a plurality of sensors, a sensor device configured to monitor operation of the turbine engine and transmit a first analog signal, and a sensor analysis device coupled to the sensor device. The sensor analysis device is configured to receive the first analog signal, capture a first plurality of samples from the first analog signal at a first rate defined by a device sampling period, determine a second rate defined by the device sampling period, capture a second plurality of samples from the first analog signal at the second rate, and detect one or more samples of the second plurality of samples that includes a transient signal above or below a threshold value.

19 Claims, 3 Drawing Sheets

DEVICES AND METHODS FOR SENSOR DATA ANALYSIS OF TRANSIENT ERRORS

BACKGROUND

The field of the disclosure relates generally to devices, systems, and methods for sensor data analysis of transient errors, including signal modification and data logging, and combinations thereof.

Many industrial engineering settings implement sensor devices for monitoring aspects of industrial device operation and health. In power plant settings, for example, a power system, such as, but not limited to, a gas turbine system, may include numerous sensors that monitor various physical conditions of components of the turbine system. Such sensors typically transmit their output signals to a control system that is capable of analyzing the sensor signals for system health, for example. The sensor data analysis performed by the control system often includes features of error detection and data logging.

However, known control systems may exhibit problems depending on the type, volume, or sample rate of data transmitted. For example, a control system may be configured to sample a given sensor signal at a pre-defined sample rate, such as every 40 milliseconds (ms), but if a transient error condition occurs between the samples, the error may go undetected by the control system. This can be partially mitigated by low-pass filtering, but such an approach can delay the response or cause the error to go undetected. Additionally, if transients occur periodically at a near-integer multiple of the sampling frequency, unwanted aliasing can occur. In some situations, a transient error may be detected or a noisy signal may generate an erroneous sample, which may, in response, trigger the control system to take an unnecessary reaction to a situation that would otherwise be harmless to the system and that thus doesn't require a corrective response. In some settings, an oscilloscope or data logger may be used to facilitate an improved analysis of transient error data in sensor signals. However, such devices require skilled operation performed onsite and may also require a correlation between the collected data and the control system data.

As such, a need exits for a device that may be coupled within the sensor signal path, i.e., between the sensor and the control system, to monitor for transient errors at an increased sample rate as compared to the underlying control system, thereby facilitating "masking" transient errors from the control system and preventing their transmission to the control system.

BRIEF DESCRIPTION

In one aspect, a sensor analysis system for monitoring operation of a turbine engine of a power plant is provided. The sensor analysis system includes a turbine control system configured to monitor a plurality of sensors associated with the turbine engine, a sensor device configured to monitor an aspect of operation of the turbine engine and transmit a first analog signal as an output signal, and a sensor analysis device coupled to the sensor device. The sensor analysis device is configured to receive the first analog signal from the sensor device and capture a first plurality of samples from the first analog signal at a first rate defined by a device sampling period, the first rate comprising a first duration between samples. The sensor analysis device is also configured to determine a second rate defined by the device sampling period, the second rate comprising a second duration between samples that is shorter than the first duration between samples captured at the first rate and capture a second plurality of samples from the first analog signal at the second rate, wherein the second plurality of samples includes the first plurality of samples separated by the first duration and an additional plurality of samples separated by the second duration. The sensor analysis device is further configured to detect one or more samples of the second plurality of samples that includes a transient signal above or below a threshold value, wherein the transient signal comprises one or more samples within the additional plurality of samples separated by the second duration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems, including one or more embodiments of the disclosure. As such, the drawings are not meant to include all conventional features known by those of ordinary skill in the art to be required for the practice of the embodiments disclosed herein.

DETAILED DESCRIPTION

The embodiments described herein overcome at least some of the disadvantages of known methods of sensor signal analysis and transient error mitigation. The present embodiments implement a sensor analysis device that may be coupled between a sensor and a control device, such as a turbine control system, to monitor for transient errors. This sensor analysis device may be coupled between the sensor and the control device such that the sensor signal is transmitted through the device to the control system during normal operations. Further, the device may monitor the sensor signal for transient errors at an increased sample rate as compared to the sample rate used by the control system, thus enabling the sensor analysis device to detect transient errors that may not be detected by the control system. After the detection of one or more transient errors, the device may report the errors, such as by transmitting transient error log data to a logging database, transmitting transient error alerts to the control system, and/or displaying transient error data for analysis via a direct connection to a another device, such as the sensor analysis device. In some embodiments, the sensor analysis device may suppress or "mask" aspects of the transient errors by, for example, modifying the output signal to remove transient error samples (e.g., signal values above or below a predefined threshold) and/or by smoothing the output signal to essentially mute the spikes of short-term transient errors (e.g., using a running average of sample values rather than the raw sample values). As such, the sensor analysis device may facilitate detecting and reporting on transient errors, such that short-term transient errors may be suppressed.

Figure 1:
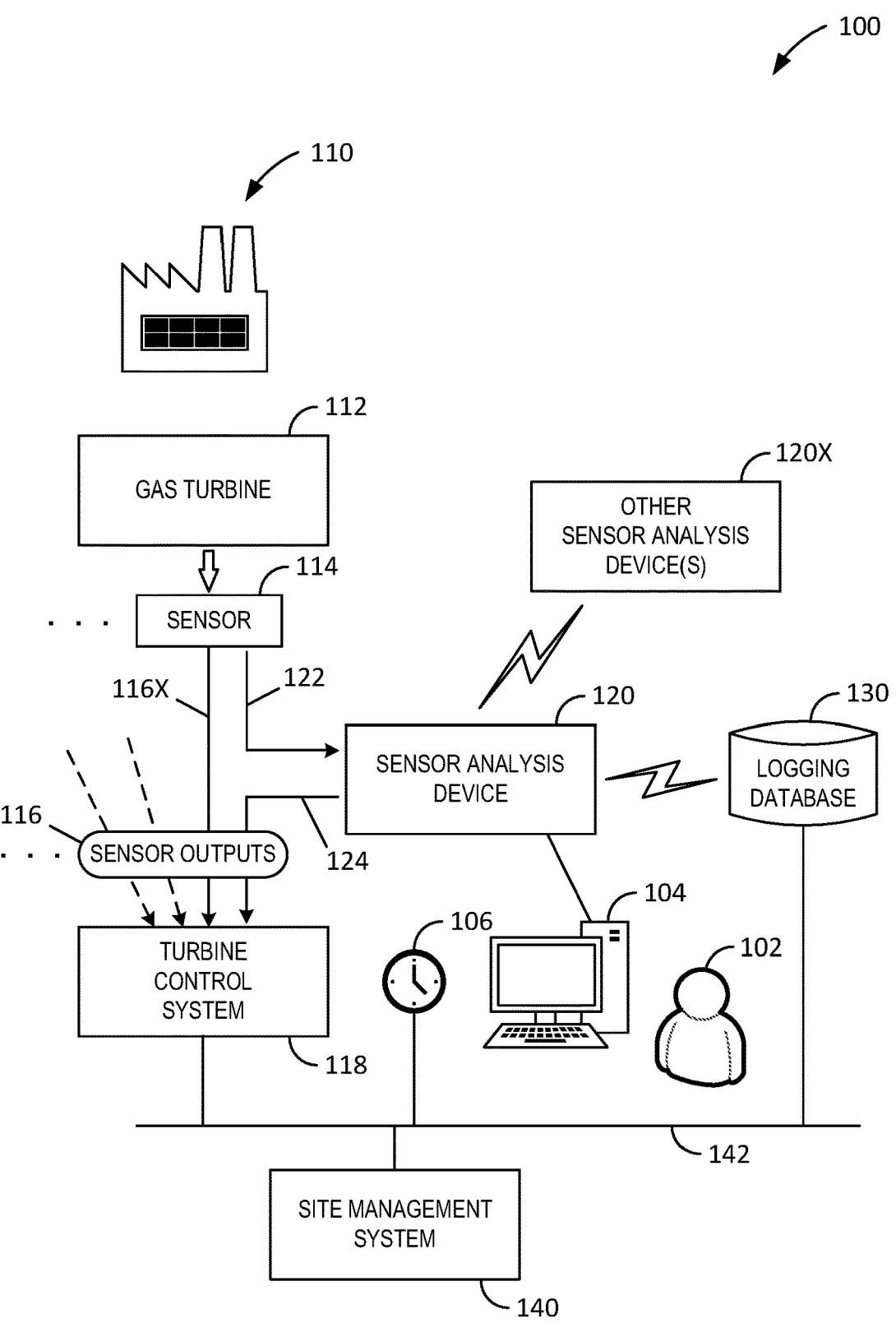
FIG. 1 is a schematic of an exemplary sensor system in which a sensor analysis device is used to monitor and manage an output signal from a sensor device.

FIG. 1 is an exemplary sensor system 100 in which a sensor analysis device 120 is used to monitor and manage an output signal from a sensor device 114. In the exemplary embodiment, the sensor system 100 is coupled within a power generation facility 110, but such a configuration is not intended to limit the scope of operations of the sensor analysis device 120 and/or its associated methods of use. In the exemplary embodiment, a gas turbine 112 within the power generation facility 110 generates power and one or more sensor devices 114 are used to monitor aspects of operation of the gas turbine 112. For example, in the exemplary embodiment, the sensor device 114 monitors the fuel current consumption of the gas turbine 112 and the power output by gas turbine 112. Generally, the sensor device 114 may be any suitable sensor known in the art that facilitates the data collection and analysis as described herein. The mention of the gas turbine 112 is intended to be illustrative, and is not intended to limit this disclosure, which may be applied to monitoring operation of various equipment in a power plant.

During normal operations, the sensor device 114 outputs an analog signal to a turbine control system 118 as a sensor output 116X of many sensor outputs 116 that may be monitored and managed by the turbine control system 118. The sensor output 116X may be, for example, a 4-20 milliamp (mA) current mode transmission or a 0-5 volt (V) voltage mode output. Moreover, in the exemplary embodiment, the sensor output 116X is transmitted through the sensor analysis device 120 (e.g., during a troubleshooting scenario, when detection and analysis of transient errors may prove useful). More specifically, the sensor output 116X may be coupled to the sensor analysis device 120 via sensor output 122 (e.g., via a patch cable, a wire, and/or the like, based on the native output of the sensor device 114) and a device output 124 may then couple the sensor analysis device 120 to the turbine control system 118 (e.g., similar to the patch cable, such as disconnecting the cable of the sensor output 116X from the sensor device 114 and connecting it to an output port of the sensor analysis device 120). In some embodiments, the analog signal generated by the sensor device 114 may be routed from the sensor output 122 to the device output 124, thus enabling the turbine control system 118 to continue using the output of sensor device 114 in its normal operations. In some embodiments and configurations, the sensor analysis device 120 may modify the sensor output 122, as described in further detail below. The mention of the turbine control system 118 is intended to be illustrative, and is not intended to limit this disclosure, which may be applied to a control system that monitors the operation of various equipment in a power plant.

In the exemplary embodiment, the sensor analysis device 120 is programmable to analyze the analog signal output of the sensor device 114 at a particular sampling time (referred to herein as the "device sampling time" or "device sample period"). The device 120 may be further programmed to perform various data analytics and logging operations, such as, but not limited to, transient error detection, reporting, and logging (e.g., identifying signal aberrations that may occur in too short of a duration to be identified by the turbine control system 118), masking or filtering of transient errors (e.g., identifying aberrations or noise that may be ignored and subsequently removing those transient errors from the signal that is transmitted to the turbine control system 118), and ripple frequency measurement. These various features and modes of operation are described in greater detail below.

In the exemplary embodiment, the sensor analysis device 120 may be configured by an analyst 102 via a service computing device 104 (e.g., a portable computing device computing device such as a laptop or tablet device or serial terminal, and via serial connection, network port and terminal emulator, wireless network interface, or the like). During operation, the sensor analysis device 120 may wirelessly connect with other sensor analysis devices 120X (e.g., via radio frequency (RF) communication, wi-fi network, or the like) or with one or more support system servers (e.g., logging database 130, the turbine control system 118, or the like, via a wired or wireless network interface, cellular modem, or the like). In some embodiments, a network 142 such as a wired or wireless network enables the turbine control system 118 to communicate with the site management system 140 and the logging database 130. In some embodiments, a time service 106 (e.g., NTP server) may be accessible via the network 142 (e.g., for time synchronization between the various devices of the sensor system 100).

Figure 2:
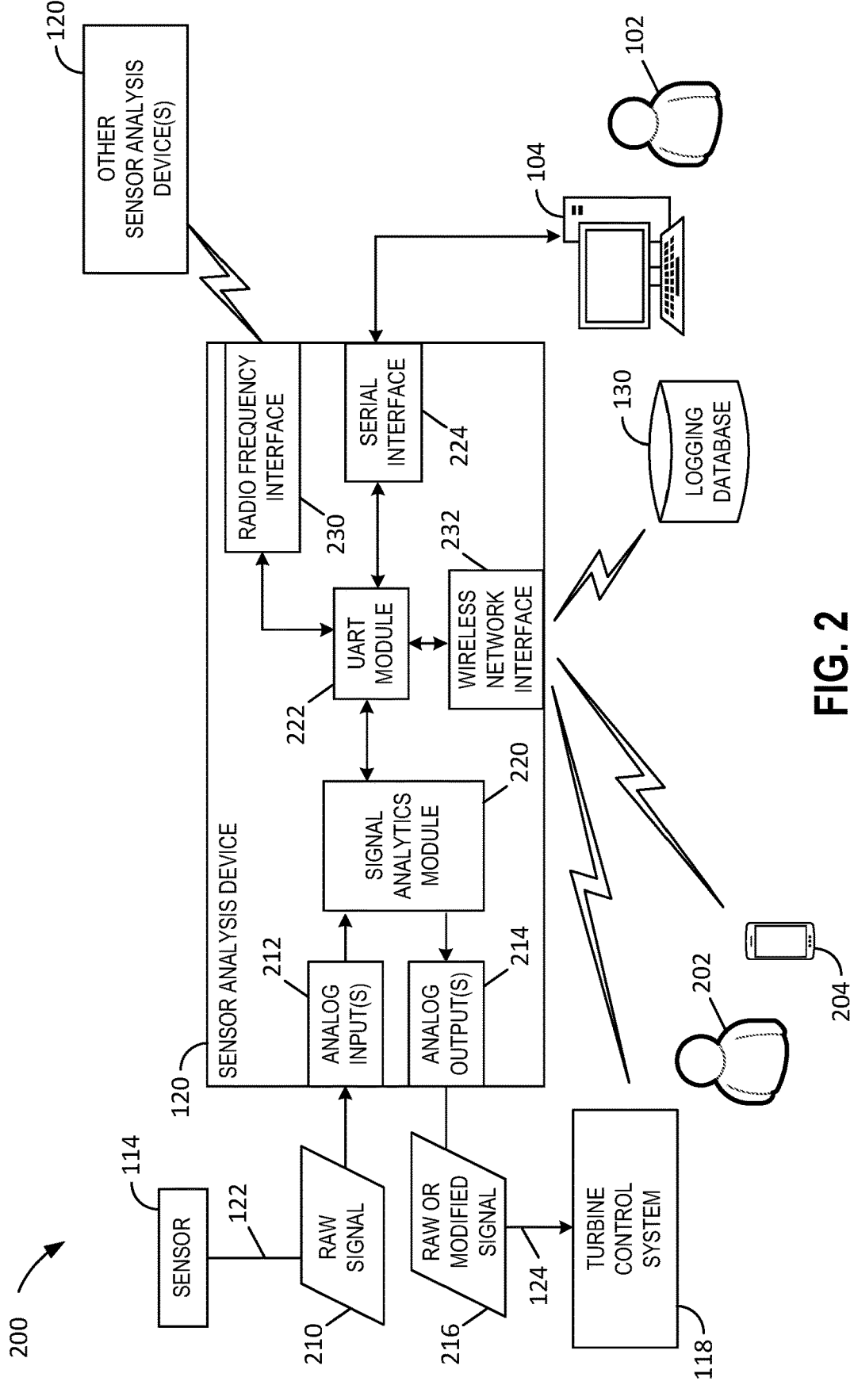
FIG. 2 is a component and dataflow diagram that illustrates additional exemplary component level details of the sensor analysis device shown in FIG. 1

FIG. 2 is a component and dataflow diagram that illustrates additional exemplary component level details of the sensor analysis device 120 shown in FIG. 1. In the exemplary embodiment, the sensor analysis device 120 includes one or more inputs 212 that are configured to enable coupling to the sensor device 114 (e.g., receiving sensor output 122). Each input 212 receives a raw signal 210, either directly or indirectly, from the sensor device 114. In some embodiments, the raw signal 210 is a 4-20 mA signal or the like. In other embodiments, the raw signal 210 may be a voltage input (e.g., 0-5V direct current (DC), over a configurable range via attenuation resistors, or the like). In some embodiments, the raw signal 210 may be an alternating current (AC) input (e.g., +/−5V AC). In some embodiments, the sensor analysis device 120 may include inputs 212 for each or any combination of these inputs.

In the exemplary embodiment, the sensor analysis device 120 also includes a signal analytics module 220 that receives the raw signal(s) 210 and performs various processing and analytics operations using the raw signal 210, each of which may be configured via various configuration parameters. In some embodiments, the signal analytics module 220 may include circuitry preconfigured to perform any or all of the various operations described herein. In some embodiments, the signal analytics module 220 may include a computer processing unit (CPU) and other associated hardware and software components sufficient to perform the operations described herein (not separately shown) and that may be programmed to perform the various operations described herein.

For example, in some embodiments, the sensor analysis device 120 may detect transient errors. Transient errors may, in some situations, be of such a short duration that they may not be detected by the turbine control system 118. As such, the sensor analysis device 120 may be configured to detect, report, and log such transient errors. More specifically, and for example, the turbine control system 118 may sample the sensor signal 122/124 at a sampling period of 40 milliseconds (ms) (the "control system sampling period"). If an error duration occurs for less than that control system sampling period, i.e., the error duration occurs between two individual control system samples, the turbine control system 118 may not detect that transient error. To detect such short-duration transient errors, the sensor analysis device may be operable with a device sampling rate that is increased as compared to the control system sampling rate (e.g., the sensor analysis device may operate receive more samples per unit time than the control system). For example, the sensor analysis device 120 may be configured with a 1 ms sample period or a 10 microsecond (µs) sample period when the example control system 118 is operating at a 40 ms sample period. As such, when monitoring the signal transmitted from the sensor device 114, the sensor analysis device 120 may more reliably detect shorter transient errors that may otherwise escape the detection by the turbine control system 118.

In some embodiments, the sensor analysis device 120 may be configured to detect and report transient error highs and/or lows. For example, the sensor analysis device 120 may be configured with a transient window (e.g., 40 ms, similar to the sampling period of the turbine control system 118) within which the sensor analysis device 120 collects multiple samples (e.g., at a 1 ms sampling period, yielding 40 samples per window). For each transient error window, the sensor analysis device 120 may be configured to identify the highest or lowest signal value detected within that window. In some configurations, the sensor analysis device 120 may report the transient error high or low value, for example by transmitting a message to the logging database 130 (e.g., via a wireless network interface 232), by transmitting a text message with the transient error data (e.g., via a wireless network interface 232), or by displaying the transient error data to the analyst 102 (e.g., via a serial interface 224 to the service computing device 104).

In some embodiments, the sensor analysis device 120 may modify an output signal 216 to facilitate the turbine control system 118, and/or another downstream monitoring system, detecting a transient error low value. For example, a transient error may occur at less than 40 ms sampling time, the control system sampling time, and may then be transmitted for a duration of 1 s to facilitate detecting the transient error by the turbine control system 118 coupled downstream from the output signal. That is, the output signal of the transient error low value, which may indicate a short transient error, may be increased to ensure detection by the turbine control system 118 and/or other downstream monitoring system.

In some embodiments, the sensor analysis device 120 may be configured to determine how many samples are above a predefined high threshold or below a predefined low threshold during a particular window of time, or a duration of time in which the samples are above a high threshold or below a low threshold. For example, and continuing the above example with a 40 ms window and 1 ms sampling period, the sensor analysis device 120 may identify a high threshold and may determine the number of samples that exceeded that high threshold during a given window. The number of samples that exceeded the high threshold may be totaled and logged, displayed, or transmitted to the turbine control system 118 for each window, and subsequently reset for each new detection window.

In some embodiments, the sensor analysis device 120 may be configured to mask high or low transient errors using sliding window averages to, for example, to facilitate reducing the effects of noise or system disturbances that may otherwise be detected by the turbine control system 118. For example, in one embodiment, the sensor analysis device 120 may be configured with a moving or sliding window of a predetermined amount of time (a length of time, e.g., a 4.8 ms sliding window) at a sampling frequency of 10 microseconds (µs) over which the device 120 calculates an average value over that window (e.g., an average of the most recent 480 samples) and/or a root mean square (RMS) over that window. The calculated value may then be displayed, logged, or transmitted to the turbine control system 118. In some embodiments, the output signal 216 may be modified to reflect the value over the window (e.g., in lieu of the current value of the device output 124), thus facilitating smoothing out short transient errors. It should be apparent that the window size and sampling frequency may be used to determine how many samples at that sampling frequency may effectively represent a window size, and as such, this feature may instead use a number of samples in conjunction with the sampling frequency to similar effect.

In some embodiments, the sensor analysis device 120 may be configured to mask high or low transient errors using the sliding window average in conjunction with a percentage threshold filter. For example, in one embodiment, the sensor analysis device 120 may be configured with a percentage threshold and a minimum duration. As each new sample is taken, each sample is compared to the moving average. If the new samples are a determined to be a certain percentage above (or a certain percentage below) the moving average for the given duration, then such samples are included in the moving window calculation. If the new samples do not exceed the percentage threshold for at least the minimum duration, then those samples are excluded from the moving window calculation. As such, a transient error that lasts a shorter duration than the minimum duration will be excluded from the moving window calculation, thus masking those brief transient errors. In some embodiments, the output signal 216 may similarly be modified to reflect this masked or filtered value. In other embodiments, the output signal 216 may be modified to reflect a representation of the transient data that occurred for greater than the minimum duration.

In some embodiments, the sensor analysis device 120 may be configured to measure and report on ripple in the raw signal 210. For example, the sensor analysis device 120 may be configured to measure the frequency of rising zero crossings across the moving average over a configured number of control system periods. The sensor analysis device 120 may then report the average frequency over that number of periods or report the average peak of the ripple cycles, and be reset after the number of periods elapses.

In the exemplary embodiment, along with any of the features described herein, the sensor analysis device 120 may be configured to route the sensor output 122 through the analog outputs 214 (e.g., as the output signal 216, substantially unchanged by the sensor analysis device 120). In such a configuration, the turbine control system 118 may still detect and react to the raw signal 210 (e.g., as if the sensor device 114 was still directly connected to the turbine control system 118). Some features may be configured to modify the output signal 216, as described in several features above. For example, some features may be configured to transmit transient error details and/or mask certain transient errors (e.g., to ensure that the turbine control system 118 does not detect and react to those transient errors). The modified output signal 216 is, as such, transmitted for interpretation and processing by the turbine control system 118.

In the exemplary embodiment, and in any or all of the various configurable features discussed herein, the sensor analysis device 120 may be configured to transmit the various output data generated by the features (or "feature data") to one or more target devices. These target devices may include, for example, the turbine control system 118, the logging database 130, the service computing device 104, or other sensor analysis devices 120X. In the exemplary embodiment, the sensor analysis device 120 includes a universal asynchronous receiver transmitter (UART) module 222 that facilitates asynchronous serial communication between the signal analytics module 220, a radio frequency interface 230, a wireless network interface, and/or a serial interface 224.

For example, in a local display mode, feature data may be transmitted to the service computing device 104 via the serial interface 224 for presentation and display to the analyst 102 (e.g., in the form of raw data samples, averages, graphs, or the like, via a character-based or graphical user interface of the service computing device 104). In a logging configuration, the feature data may be transmitted to a logging database 130 via the wireless network interface 232 (e.g., local wi-fi network, cellular network, or the like) or a wired network interface (not shown). In an alerting configuration, the feature data may be transmitted to a mobile device 204 of an operator 202 (e.g., via SMS text message over cellular network). In an integrated management configuration, the feature data may be transmitted to the turbine control system 118 via the wireless network interface 232 or a wired network interface.

In some embodiments, feature data may be transmitted between the sensor analysis device 120 and other sensor analysis devices 120X. For example, an additional sensor analysis device 120X may be configured to transmit its feature data to the sensor analysis device 120 via the radio frequency interface 230. As such, the sensor analysis device 120 may, additionally or alternatively, display or transmit the feature data of the sensor analysis device 120X to any of the target devices 104, 118, 130, 204 similar to the feature data of the sensor analysis device 120.

In some embodiments, feature data may be introduced by the UART module 222 to the signal analytics module 220 and/or the analog outputs 214. For example, the signal analytics module 220 may be programmed to toggle the input mode from the input 212 to the UART module 222.

In some embodiments, the direct transmission of the transient error data to the turbine control system 118 may facilitate improved accuracy and/or efficiency of data transmission. For example, a calibration may be performed via the user interface after the transient error data is transmitted directly to the turbine control system 118 to more efficiently and accurately compare the data of the turbine control system 118 to the transient error data. The calibration performed via the user interface may include, but is not limited to, synchronizing the output signal to a control system clock, such as by the transmission of a square wave at the control system sampling period with the bias between the control system clock and the UART module 222 removed. This bias adjustment may facilitate capturing a change in the device signal output by the control system at the control system capture rate.

Figure 3:
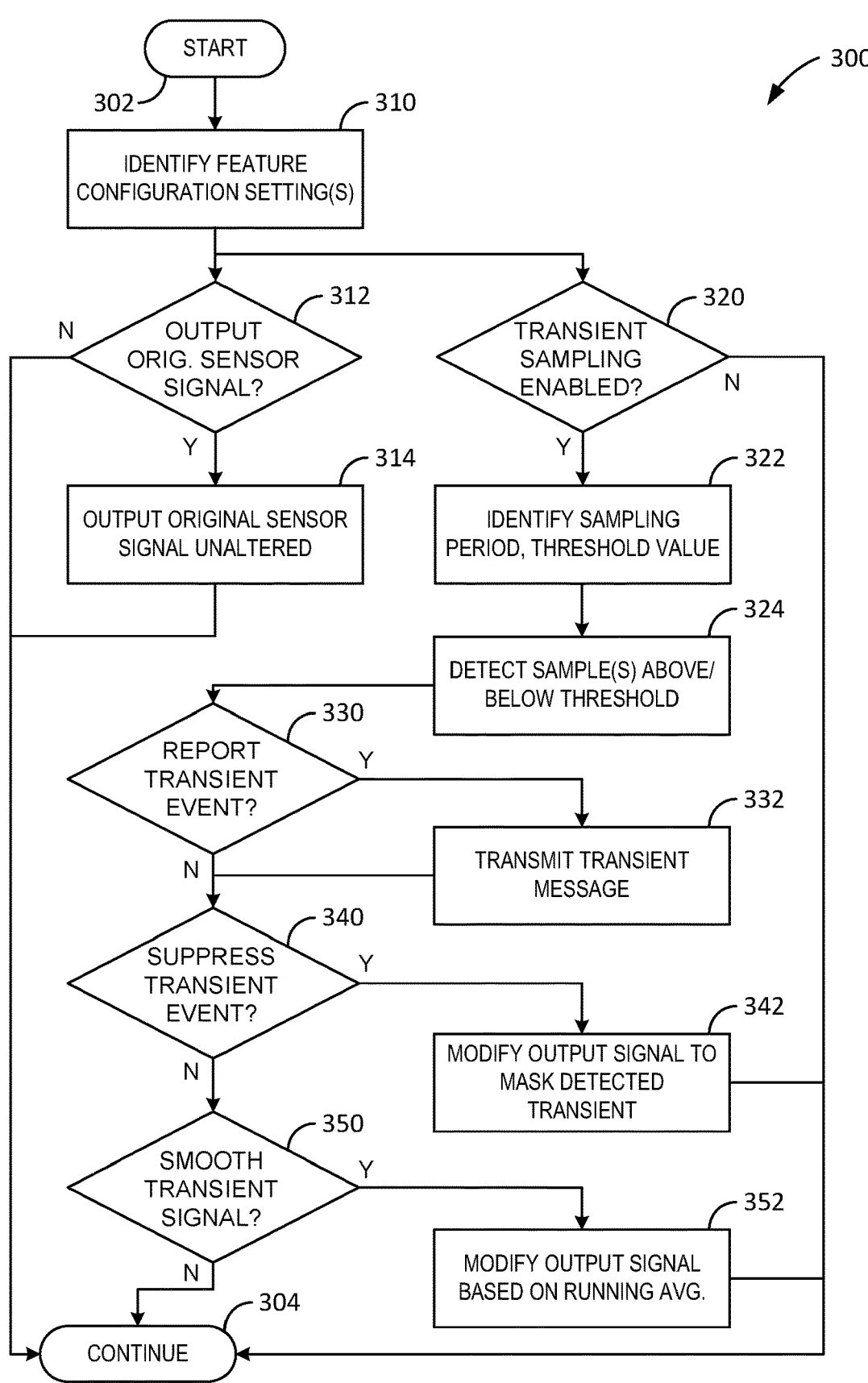
FIG. 3 is a flow chart of an exemplary method for use in detecting transient errors included in a sensor signal.

FIG. 3 is a flow chart of an exemplary method 300 for performing various transient error detection features from within a sensor signal. In some embodiments, the method 300 is performed by the sensor analysis device 120 shown in FIG. 1 and FIG. 2. In the exemplary embodiment, the method 300 initiates operation 302 and is presumed to be operating on an input signal from a sensor device, such as the raw signal 210 of sensor device 114 as shown in FIG. 2. Transient error feature configuration settings are then identified 310. These settings identify which of many possible transient error detection features are currently enabled for operation, as well as identifies which of the various variables may be associated with each feature.

In some configurations, the method 300 may include outputting 312 the original sensor signal (e.g., as substantially unchanged by any of the features of this method 300).

If, outputting 312 of the original sensor signal is enabled, then the original sensor signal is output 312 (e.g., via analog output 214, as an output signal 216). In both situations, the method 300 continues operation 304.

Additionally, the method 300 may enable transient error sampling 320 and various features associated therewith. If transient error sampling 320 is enabled, then a sampling period and threshold value is identified 322. Identifying 322 may include identifying whether the transient error detection is configured to identify excessively high values or excessively low values in the signal (e.g., a high threshold, a low threshold), or both. The input signal is modified 324 (e.g., continuously during device operation, and at a rate specified by the sampling period). When one or more samples are detected that exceed the configured threshold(s) (e.g., too high or too low), then a transient error event has been detected.

The method 300 may enable reporting 330 of transient error events. If, transient error reporting 330 is enabled, then transient error message(s) are transmitted. Such transient event reporting 330 may include, for example, displaying transient error event data (e.g., to the service computing device 104 via serial interface 224), transmitting a logging message (e.g., to logging database 130), transmitting a text message (e.g., to mobile device 204), transmitting transient error event data to turbine control system 118, and/or the like.

The method 300 may enable suppressing 340 transient error events. If transient error suppression 340 is enabled, then the output signal is modified 324 to mask the detection of the transient error event. The modifying 324 may include modifying the signal to reflect the threshold value or some other artificial value (e.g., some more nominal value) in lieu of the excessive samples. In other words, the signal may be altered to remove the excessive samples by modifying the output signal with some nominal value during the sample times that are excessive. As such, the output signal would have the excessive transient error values effectively removed (e.g., being replaced with, for example, a normal value or the threshold value), and thus being undetectable by any consumer of the output signal.

The method 300 may be configured to perform signal smoothing 350, and thus mute the spikes in signal value that may be seen with short-term transient errors. If signal smoothing 350 is enabled, then the output signal may be modified 352. This signal smoothing 350, in some embodiments, involves computing a running average of a most recent set of signals and modifying the output signal to reflect the running average value rather than the raw input value. For example, in some embodiments, a window size may be provided (e.g., in number of samples, in unit time, or the like, of a moving or sliding window) that effectively identifies how many samples are used to compute the running average. As such, at every new sample, modifying 352 includes summing and averaging all of most recent samples within the sliding window. In some embodiments, modifying 352 may include continuously outputting the running average as the output signal in lieu of the input signal (e.g., continuous smoothing with running average). In other embodiments, modifying 352 may include outputting the running average only during sample periods where the sample has exceeded one of the thresholds, while outputting the original input value during sample periods that do not exceed the threshold (e.g., limited smoothing with running average).

In some embodiments, the running average computation may be modified 352 based on a percentage threshold and duration. More specifically, modifying 352 may include identifying a percentage threshold value (e.g., 30%) and a duration (e.g., in samples, or unit time). In such an embodiment, when one or more of the most recent samples exceed the current average value by an amount of the percentage threshold value (e.g., samples more than 30% of the average in the case of higher samples and a high configuration, or samples less than 30% of the average in the case of lower samples and a low configuration), but for a time duration less than the specified duration, then those samples are excluded from the average signal value computation. When one or more of the most recent samples exceed the percentage threshold for more than the specified time duration, then those samples will be included in the average computation. As such, this feature may further help eliminate short-duration transient errors by excluding those samples from the average computation, thus muting any effect on the output (e.g., by reducing any impact even on the average value through excluding the aberrant samples).

In some embodiments, the method 300 may include identifying a highest sample value or a lowest sample value within a particular window. In some embodiments, the method 300 may include identifying a sample count of how many samples, within a period of time, exceed a threshold value (e.g., are above a high threshold value or below a low threshold value.

Exemplary systems and methods for sensor data analysis of transient errors, including signal modification and data logging, and combinations thereof, are described herein. The exemplary systems as described herein provide several advantages over conventional designs and processes, including, at least, monitoring for transient errors at an increased sample rate as compared to the underlying control system, and facilitating "masking" transient errors from the control system and preventing their transmission to the control system.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems described herein are not limited to the specific embodiments described herein, but rather portions of the various systems may be utilized independently and separately from other systems described herein.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the present disclosure are provided by the subject matter of the following clauses:

A sensor analysis system for monitoring operation of a turbine engine of a power plant, the sensor analysis system comprising: a turbine control system configured to monitor a plurality of sensors associated with the turbine engine; a sensor device configured to monitor an aspect of operation of the turbine engine and transmit a first analog signal as an output signal; and a sensor analysis device coupled to the sensor device, the sensor analysis device configured to:

receive the first analog signal from the sensor device; capture a first plurality of samples from the first analog signal at a first rate defined by a device sampling period, the first rate comprising a first duration between samples; determine a second rate defined by the device sampling period, the second rate comprising a second duration between samples that is shorter than the first duration between samples captured at the first rate; capture a second plurality of samples from the first analog signal at the second rate, wherein the second plurality of samples includes the first plurality of samples separated by the first duration and an additional plurality of samples separated by the second duration; and detect one or more samples of the second plurality of samples that includes a transient signal above or below a threshold value, wherein the transient signal comprises one or more samples within the additional plurality of samples separated by the second duration.

The sensor analysis system in accordance with any of the preceding clauses, wherein the sensor analysis device is further configured to transmit a first message to a computing device, wherein the first message includes the transient signal within the first analog signal.

The sensor analysis system in accordance with any of the preceding clauses, wherein the sensor analysis device is further configured to transmit the first message to the turbine control system.

The sensor analysis system in accordance with any of the preceding clauses, wherein the sensor analysis device is further configured to transmit a second analog signal via an analog output port.

The sensor analysis system in accordance with any of the preceding clauses, wherein the second analog signal includes a first portion representing the first analog signal.

The sensor analysis system in accordance with any of the preceding clauses, wherein the second analog signal includes a second portion representing a modification of the first analog signal.

The sensor analysis system in accordance with any of the preceding clauses, wherein the modification of the first analog signal comprises modifying the first analog signal based on the threshold value.

The sensor analysis system in accordance with any of the preceding clauses, wherein the sensor analysis device is further configured to: identify a subset of the second plurality of samples within a sampling period subset of the device sampling period; and determine an average signal value of the subset of the second plurality of samples.

The sensor analysis system in accordance with any of the preceding clauses, wherein the second analog signal includes a third portion based on the average signal value.

The sensor analysis system in accordance with any of the preceding clauses, wherein the sensor analysis device is further configured to: determine a percentage threshold value; and identify a second subset of the second plurality of samples, wherein the second subset of the second plurality of samples includes one or more samples that exceed the percentage threshold value.

The sensor analysis system in accordance with any of the preceding clauses, wherein the first message includes one or more samples of the second plurality of samples that include a maximum signal value.

The sensor analysis system in accordance with any of the preceding clauses, wherein the first message includes one or more samples of the second plurality of samples that include a minimum signal value.

The sensor analysis system in accordance with any of the preceding clauses, wherein the first message includes one or more samples of the second plurality of samples that include the maximum signal value and the minimum signal value.

The sensor analysis system in accordance with any of the preceding clauses, wherein the sensor analysis device is further configured to determine a number of samples of the one or more samples above or below the threshold value.

The sensor analysis system in accordance with any of the preceding clauses, further comprising a radio frequency (RF) interface coupled to at least one additional sensor.

The sensor analysis system in accordance with any of the preceding clauses, wherein the sensor analysis device is further configured to receive sensor data via the radio frequency (RF) interface coupled to the at least one additional sensor.

The sensor analysis system in accordance with any of the preceding clauses, further comprising a wireless network interface coupled to the computing device.

The sensor analysis system in accordance with any of the preceding clauses, wherein the sensor analysis device is further configured to transmit the first message to the computing device via the wireless network interface.

The sensor analysis system in accordance with any of the preceding clauses, wherein the sensor analysis device is further configured to transmit a message to a mobile device, the message including transient signal data indicating detection of the transient signal.

The sensor analysis system in accordance with any of the preceding clauses, wherein the message includes signal values of the one or more samples comprising the transient signal.

References to "some embodiments" in the above description are not intended to be interpreted as excluding the existence of additional embodiments that also incorporate the recited features.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Although specific features of various embodiments of the invention may be shown in some drawings and not in others, this is for convenience only. Moreover, references to "some embodiments" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor analysis system for monitoring operation of a turbine engine of a power plant, the sensor analysis system comprising:
   a turbine control system configured to monitor a plurality of sensors associated with the turbine engine;
   a sensor device configured to monitor an aspect of operation of the turbine engine and transmit a first analog signal as an output signal; and
   a sensor analysis device coupled to the sensor device, the sensor analysis device configured to:
   receive the first analog signal from the sensor device;
   sample the first analog signal at a first rate defined by a device sampling period, the first rate comprising a first duration between samples;
   determine a second rate comprising a second duration between samples that is shorter than the first duration between samples captured at the first rate;
   sample the first analog signal at the first rate and the second rate;
   detect one or more samples from the second rate which includes a transient signal above or below a threshold value; and
   transmit a first message to a computing device, wherein the first message includes the transient signal within the first analog signal.

2. The sensor analysis system in accordance with claim 1, wherein the sensor analysis device is further configured to transmit the first message to the turbine control system.

3. The sensor analysis system in accordance with claim 1, wherein the sensor analysis device is further configured to transmit a second analog signal via an analog output port.

4. A sensor analysis system for monitoring operation of a turbine engine of a power plant, the sensor analysis system comprising:
   a turbine control system configured to monitor a plurality of sensors associated with the turbine engine;
   a sensor device configured to monitor an aspect of operation of the turbine engine and transmit a first analog signal as an output signal; and
   a sensor analysis device coupled to the sensor device, the sensor analysis device configured to:
   receive the first analog signal from the sensor device;
   sample the first analog signal at a first rate defined by a device sampling period, the first rate comprising a first duration between samples;
   determine a second rate comprising a second duration between samples that is shorter than the first duration between samples captured at the first rate;
   sample the first analog signal at the first rate and the second rate;
   detect one or more samples from the second rate which includes a transient signal above or below a threshold value; and
   wherein the sensor analysis device is further configured to transmit a second analog signal via an analog output port; and
   wherein the second analog signal includes a first portion representing the first analog signal.

5. The sensor analysis system in accordance with claim 4, wherein the second analog signal includes a second portion representing a modification of the first analog signal.

6. The sensor analysis system in accordance with claim 5, wherein the modification of the first analog signal is based on the threshold value.

7. The sensor analysis system in accordance with claim 5, wherein the sensor analysis device is further configured to:
identify a subset of the samples from the second rate within a sampling period subset of the device sampling period; and
determine an average signal value of the subset of the second plurality of samples.

8. The sensor analysis system in accordance with claim 7, wherein the second analog signal includes a third portion based on the average signal value.

9. The sensor analysis system in accordance with claim 8, wherein the sensor analysis device is further configured to:
determine a percentage threshold value; and
identify a second subset of the samples from the second rate, wherein the second subset includes one or more samples that exceed the percentage threshold value.

10. The sensor analysis system in accordance with claim 1, wherein the first message includes one or more samples from the second rate that include a maximum signal value.

11. The sensor analysis system in accordance with claim 10, wherein the first message includes one or more samples from the second rate that include a minimum signal value.

12. The sensor analysis system in accordance with claim 11, wherein the first message includes one or more samples from the second rate that include the maximum signal value and the minimum signal value.

13. The sensor analysis system in accordance with claim 4, wherein the sensor analysis device is further configured to determine a number of samples above or below the threshold value.

14. The sensor analysis system in accordance with claim 4, further comprising a radio frequency (RF) interface coupled to at least one additional sensor.

15. The sensor analysis system in accordance with claim 14, wherein the sensor analysis device is further configured to receive sensor data via the radio frequency (RF) interface coupled to the at least one additional sensor.

16. The sensor analysis system in accordance with claim 1, further comprising a wireless network interface coupled to the computing device.

17. The sensor analysis system in accordance with claim 6, wherein the sensor analysis device is further configured to transmit the first message to the computing device via the wireless network interface.

18. A sensor analysis system for monitoring operation of a turbine engine of a power plant, the sensor analysis system comprising:
a turbine control system configured to monitor a plurality of sensors associated with the turbine engine;
a sensor device configured to monitor an aspect of operation of the turbine engine and transmit a first analog signal as an output signal; and
a sensor analysis device coupled to the sensor device, the sensor analysis device configured to:
receive the first analog signal from the sensor device;
sample the first analog signal at a first rate defined by a device sampling period, the first rate comprising a first duration between samples;
determine a second rate comprising a second duration between samples that is shorter than the first duration between samples captured at the first rate;
sample the first analog signal at the first rate and the second rate;
detect one or more samples from the second rate which includes a transient signal above or below a threshold value; and
transmit a message to a mobile device, the message including transient signal data indicating detection of the transient signal.

19. The sensor analysis system in accordance with claim 18, wherein the message includes signal values of the one or more samples comprising the transient signal.

* * * * *